United States Patent
Bakey (10) Patent No.: US 7,945,542 B2
(45) Date of Patent: *May 17, 2011

(54) DISTRIBUTED HIERARCHICAL CACHE

(75) Inventor: Shaun Bakey, Dublin, CA (US)

(73) Assignee: Oracle International Corporation, Redwood Shores, CA (US)

( * ) Notice: Subject to any disclaimer, the term of this patent is extended or adjusted under 35 U.S.C. 154(b) by 232 days.

This patent is subject to a terminal disclaimer.

(21) Appl. No.: 11/893,610

(22) Filed: Aug. 15, 2007

(65) Prior Publication Data

US 2008/0027956 A1   Jan. 31, 2008

Related U.S. Application Data

(63) Continuation of application No. 10/756,641, filed on Jan. 12, 2004, now Pat. No. 7,272,609.

(51) Int. Cl.
*G06F 17/00* (2006.01)
*G06F 17/30* (2006.01)

(52) U.S. Cl. ........ 707/695; 707/638; 707/797; 707/806; 707/829

(58) Field of Classification Search .......... 707/2, 4, 707/10, 100, 102, 200–203, 205–206, 609, 707/651–652, 672, 695, 703, 778, 791–792, 707/812, 829, 624–625, 638, 702, 797, 806; 711/118–126, 129–132, 142–143; 710/200–243
See application file for complete search history.

(56) References Cited

U.S. PATENT DOCUMENTS

| | | | | |
|---|---|---|---|---|
| 5,283,894 A | * | 2/1994 | Deran | 707/1 |
| 5,317,731 A | * | 5/1994 | Dias et al. | 707/8 |
| 5,388,196 A | * | 2/1995 | Pajak et al. | 715/751 |
| 5,551,046 A | * | 8/1996 | Mohan et al. | 707/8 |
| 5,574,902 A | * | 11/1996 | Josten et al. | 707/1 |
| 5,636,359 A | * | 6/1997 | Beardsley et al. | 711/122 |
| 5,870,758 A | * | 2/1999 | Bamford et al. | 1/1 |

(Continued)

FOREIGN PATENT DOCUMENTS

WO   WO 02/052430   * 7/2002

(Continued)

OTHER PUBLICATIONS

Utku Irmak "Hierarchical Substring Caching for Efficient Content Distribution to LowBandwidth Clients", ACM 2005, 11 pages.*

(Continued)

*Primary Examiner* — Srirama Channavajjala
(74) *Attorney, Agent, or Firm* — Kilpatrick Townsend & Stockton LLP (57) ABSTRACT

A solution may be provided in which a cache may assign a version to each object that it caches. The version may be saved in a database along with the object. Each time the business logic accesses the cache for a dependent object, such as a read from the bit mask field of the new parent member, the version of the object checked in the cache and its identification may be saved on a dependency list. Once changes to the object are performed, the business logic may issue a commit command. The cache may then verify that the version of each object on the dependency list matches the version that is in the database. If an object on the dependency list either does not exist in the database, or exists with another version, then the transaction may be canceled.

15 Claims, 3 Drawing Sheets

U.S. PATENT DOCUMENTS

| | | | | |
|---|---|---|---|---|
| 5,878,206 | A * | 3/1999 | Chen et al. | 714/19 |
| 5,897,636 | A * | 4/1999 | Kaeser | 1/1 |
| 5,974,407 | A * | 10/1999 | Sacks | 1/1 |
| 6,073,129 | A * | 6/2000 | Levine et al. | 707/4 |
| 6,438,653 | B1 * | 8/2002 | Akashi et al. | 711/128 |
| 6,480,847 | B1 * | 11/2002 | Linenbach et al. | 707/8 |
| 6,539,398 | B1 * | 3/2003 | Hannan et al. | 707/103 R |
| 6,560,601 | B1 * | 5/2003 | Bjornerstedt | 1/1 |
| 6,571,259 | B1 * | 5/2003 | Zheng et al. | 707/205 |
| 6,792,436 | B1 * | 9/2004 | Zhu et al. | 707/203 |
| 6,816,873 | B2 * | 11/2004 | Cotner et al. | 1/1 |
| 6,836,774 | B2 * | 12/2004 | Melbin | 707/10 |
| 6,853,997 | B2 * | 2/2005 | Wotring et al. | 707/100 |
| 2001/0034733 | A1 * | 10/2001 | Prompt et al. | 707/102 |
| 2002/0010700 | A1 * | 1/2002 | Wotring et al. | 707/100 |
| 2002/0143764 | A1 * | 10/2002 | Martin et al. | 707/8 |
| 2003/0154204 | A1 * | 8/2003 | Chen-Wright et al. | 707/100 |
| 2004/0054641 | A1 * | 3/2004 | Smith | 707/1 |
| 2004/0162838 | A1 * | 8/2004 | Murayama et al. | 707/100 |
| 2005/0065907 | A1 * | 3/2005 | Chandrasekaran et al. | 707/1 |

FOREIGN PATENT DOCUMENTS

| | | | |
|---|---|---|---|
| WO | WO 03/096226 | * | 11/2003 |
| WO | WO 2004025519 | * | 3/2004 |

OTHER PUBLICATIONS

Ahmed K. Elmagarmid et al, A unifying approach to hierarchical transaction management in multidatabase systems, Jan. 1993, pp. 28.*

D. Roller et al. "Integrated version and transaction group model for shared engineering databases", Data & Knowledge Engineering 42 (2002) 223-245.*

* cited by examiner

DISTRIBUTED HIERARCHICAL CACHE

CLAIM OF PRIORITY

This application is a continuation of U.S. patent application Ser. No. 10/756,641, now U.S. Pat. No. 7,272,609, entitled "In a distributed hierarchical cache, using a dependency to determine if a version of the first member stored in a database matches the version of the first member returned", filed on Jan. 12, 2004 and claims priority thereto, and is hereby incorporated herein by reference for all purposes.

FIELD OF THE INVENTION

The present invention relates to the field of computer databases. More specifically, the present invention relates to a distributed cache for a database, the cache allowing access to hierarchical data.

BACKGROUND OF THE INVENTION

Hierarchical data is data that contains dependency relationships between pieces of information. A dependency may be formed if, for example, one piece of data cannot be modified without also modifying the other piece of data. For example, each piece of data in a hierarchy may have a bit mask field. The business logic may have a rule that a child member cannot have its bit set unless the parent does. Thus, the child and parent have a dependency relationship. A dependency may also be formed if one piece of data cannot be modified without reading the state of another piece of data. In the above example, this would be the case if the logic has a rule that the child member cannot be modified if the state of the parent does not match the state of the child. One of ordinary skill in the art would recognize there may be other relationships and/or rules that would give rise to a dependency.

Hierarchical data is straightforward to handle when only a single user accesses the data. Problems are encountered, however, when multiple users attempt to access and/or modify hierarchical data simultaneously. This can be quite common in today's database environments, where hierarchical data is managed across multiple horizontally scaled servers and many users attempt to edit the hierarchy at the same time.

One way to handle this problem is to lock the entire hierarchy while editing. However, this only supports one user at a time, which cuts in to efficiency. A second user must wait until the first user has completed editing before editing the data himself. This is especially limiting for web-based applications, where it is quite easy for a user to accidentally leave open an editing window indefinitely, thus locking other users out indefinitely.

Another way to handle this problem is to allow users to modify separate copies of the hierarchy, and then to merge them when they are both done. However, this creates problems in that when there are conflicts between the changes, the second user must manually merge their changes with the changes of the first user. This can create downtime where the second user must contact the first user to determine why the changes should be implemented and resolve the conflict, all the while a third user may go ahead and make another conflicting modification. Additionally, the entire hierarchy needs to be copied from the server, modified, and then saved in full. This can utilize a tremendous amount of bandwidth and memory space, especially when it is common for hierarchies to be on the order of 60,000 members large, and when many users are accessing the hierarchy simultaneously.

Some databases address these issues by allowing data to be modified at the record level. This drastically decreases update time, and also allows a user to lock only the parts of the hierarchy that are changed. However, this solution only works for flat data, not hierarchical data. Assume, for example, that a user moves a member from one parent to another. Then the status of the new parent may be checked and find that each bit set in the moved member is also in the parent. The system will assume that everything is fine and the transaction will be committed. The problem occurs when, on another server, a user turns off a bit in the bit mask of the new parent. When this other server checks to see if any children had this bit turned off, it finds no children, as this server is not aware of the move yet. A few seconds layer, a user on a third server now sees a member underneath a parent that has a bit set that his parent does not have, which violates the business logic.

A final potential solution would be to simply have all reads and writes performed directly to the database, by using the proper isolation level. However, if this is done, a cache cannot be used and the performance benefits of the cache are lost, which can be significant in a multiple-user environment.

What is needed is a solution that allows for editing of hierarchical data in a cache by multiple users without creating conflicts and without sacrificing performance.

BRIEF DESCRIPTION

A solution may be provided in which a cache may assign a version to each object that it caches. The version may be saved in a database along with the object. Each time the business logic accesses the cache for a dependent object, such as a read from the bit mask field of the new parent member, the version of the object checked in the cache and its identification may be saved on a dependency list. Once changes to the object are performed, the business logic may issue a commit command. The cache may then verify that the version of each object on the dependency list matches the version that is in the database. If an object on the dependency list either does not exist in the database, or exists with another version, then the transaction may be canceled.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hard wired devices, field programmable gate arrays (FPGAs), application specific integrated circuits (ASICs), or the like, may also be used without departing from the scope and spirit of the inventive concepts disclosed herein.

A solution may be provided in which a cache may assign a version to each object that it caches. The version may be saved in a database along with the object. Each time the business logic accesses the cache for a dependent object, such as a read from the bit mask field of the new parent member, the version of the object checked in the cache and its identification may be saved on a dependency list. Once changes to the object are performed, the business logic may issue a commit command. The cache may then verify that the version of each object on the dependency list matches the version that is in the cache. If an object on the dependency list either does not exist in the database, or exists with another version, then the transaction may be canceled.

Since only the records actually changed in the database will be locked in the database, this solution allows the cache to selectively lock only what the combination of what the user changed and the information this change relied upon, which most of the time in a large hierarchy will wind up being a very small portion of the hierarchy and will not conflict with other concurrent changes. If the change does conflict, then the version discrepancy will catch it and the second change can be rejected. Additionally, unlike when writing only the changes to the database (which is faster but does not guarantee accuracy), the business logic can be guaranteed that hierarchically related data will be consistent when concurrently edited by multiple users across multiple servers, even if each server's cache diverges from the true state of the database.

Figure 1:
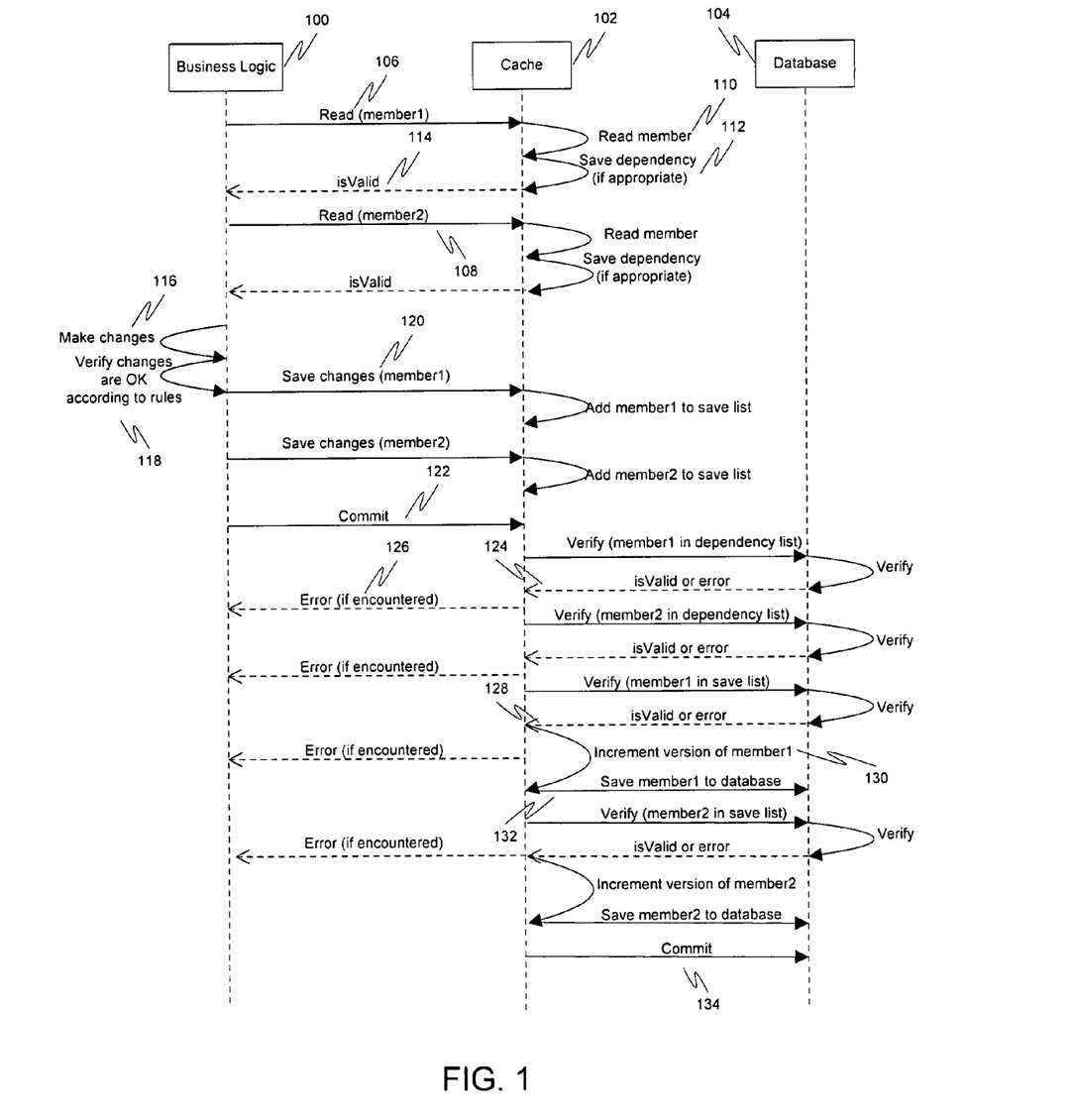
FIG. 1 is a sequence diagram illustrating editing hierarchical data in a database in accordance with an embodiment of the present invention.

FIG. 1 is a sequence diagram illustrating editing hierarchical data in a database in accordance with an embodiment of the present invention. The business logic 100 may communicate with the cache 102, and the cache 102 with the database 104. The cache 102 may be periodically refreshed with the entire hierarchy from the database 104.

FIG. 1 depicts the editing of hierarchical data relating to a single transaction. However, in practice it may be beneficial to allow editing of hierarchical data relating to multiple transactions. In such an instance, the embodiment may be modified so that transaction identifications are passed with function calls, allowing each component to correlate the call with a specific transaction.

When a user wishes to access a data item or data items, the business logic 100 may send one or more read commands 106, 108 to the cache 102. In the example depicted in FIG. 1, two read commands are issued, indicating that the user wishes to access two data items. One of ordinary skill in the art, however, will recognize that any number of read commands may be utilized.

The first read command 106 indicates that the business logic 100 wishes to access member1. The cache 102 may then read 110 member1 out of its memory. If for some reason this fails (e.g., member1 doesn't exist in the memory), then an error may be returned. Otherwise a dependency may be saved 112 if appropriate. In an embodiment of the present invention, the business logic determines whether or not the member (member1) has a dependency with another member in the hierarchy. If so (or if there is some other reason that the member should be tracked), then the business logic may set a flag to indicate that the member (member1) should be tracked. This indicates to the cache 102 that it should save the dependency. In an embodiment of the present invention, saving the dependency involves adding an identification of the member (member1) and its current version to a dependency list. At this point, the cache 102 may return the information using an isValid message 114. The same process may be performed for the second read command 108.

The user may then make some changes 116 to the hierarchical data. The business logic may verify 118 that these changes are allowed according to the rules. This verification prevents the user from, for example, making a change to a hierarchical data item without also changing a dependent hierarchical data item. However, this verification cannot protect against another user from simultaneously making a conflicting change. This will be handled later.

Once all the changes have been made and verified, the business logic 100 may send a save command 120 to the cache 102. This command may be repeated for each object that was changed. In response to the save changes command, the cache 102 may add the object to a save list. Once all the changes have been saved, the business logic 100 may send a commit command 122 to the cache 102.

At this point, the cache 102 may run through each of the members of the dependency list. Assume in this example that member1 and member2 are on the dependency list, and that both members were also changed by the user and/or business logic 100. The cache 102 may first send a verify command for member1 to the database. The verify command may include an identification of member1 as well as the version number that was saved on the dependency list. The database 104 may then verify that the version number from the dependency list matches the version number in the database 104 for member1. If it does not, or if member1 is not found in the database, then it may send back an error. Otherwise, it may send back an isValid message 124. The cache may return the error 126 to the business logic 100 if an error was received. The process is then repeated for member2 (and any other members on the dependency list).

Once the dependency list has been completely traversed, the cache 102 may then turn to the save list. The save list here may contain member1 and member2. The cache 102 may then send a verify command for member1 to the database. While this may appear to be repetitive with the members on the dependency list, in most cases the members on the save list will differ from the members on the dependency list. Additionally, it is possible that the version of a member may have changed between the time it is verified via the dependency list and the time it is verified via the save list. This is especially important in that upon receipt of an isValid return message 128, the cache 102 may increment the version of the member 130 and then save the member 132 to the database 104. This process may be repeated for member2 and any other members on the save list. If at any point the database 104 cannot verify a member, it may send back an error message, which may then be passed from the cache 102 to the business logic 100.

Once the save list has been completely traversed, the cache 102 may send a commit command 134 to the database 104. This indicates to the database that it is time to implement the saved changes.

The database 104, when receiving the verify messages for each member, may lock or otherwise protect the corresponding members in the hierarchy. This prevents another user from changing the member before it has been committed. However, since the present invention is generally only verifying a small percentage of the hierarchy, the odds of a conflict are quite small and thus most users will not notice any delay in making modifications to the hierarchy.

Figure 2:
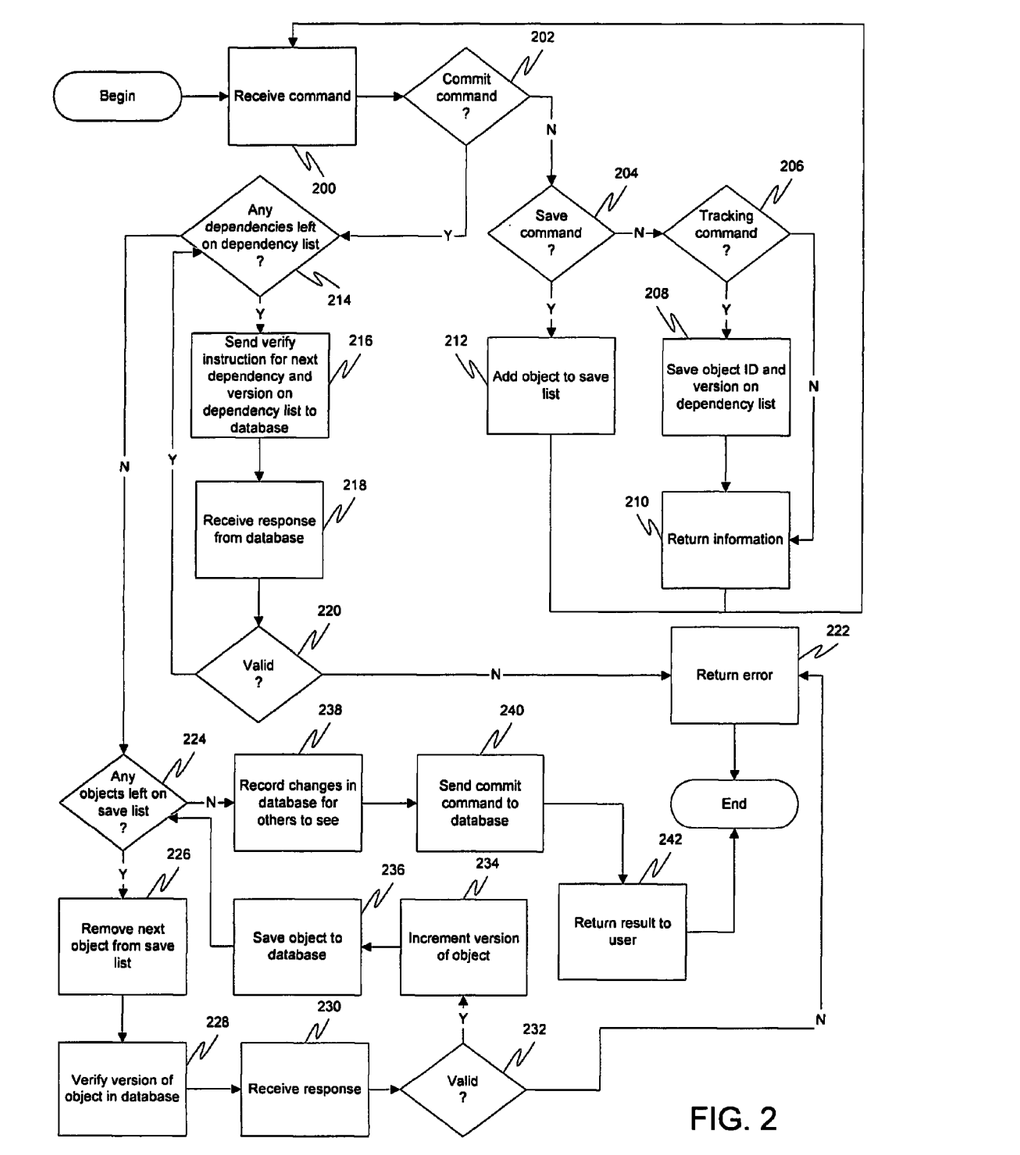
FIG. 2 is a flow diagram illustrating a method for editing hierarchical data in accordance with an embodiment of the present invention.

FIG. 2 is a flow diagram illustrating a method for editing hierarchical data in accordance with an embodiment of the present invention. The method may be performed by the cache, or by a device or program controlling the cache. Each of the acts performed by the method may be performed by hardware or software.

At 200, a command may be received. The command may include, for example, a member identification as a parameter. Additionally, if multiple transactions exist, the command may include a transaction identification. At 202, it may be determined if the command is a commit command. If not, then at 204 it may be determined if the command is a save command. If not, then at 206 it may be determined if the command is a tracking command. A tracking command may be defined as a command that is to be tracked. The most obvious example of this for purposes of this document will be a command asking to read a member that has a dependency relationship with another member, however one of ordinary skill in the art will recognize that other commands to be tracked may exist. The tracking command may be designated by a flag accompanying the command indicating that the command is one that should be tracked.

If the command is a tracking command, then at 208, the object ID and version corresponding to the member received with the command may be saved on a dependency list. The version maybe retrieved from the hierarchy stored in the cache. Then at 210, the information requested by the command may be returned. If at 206 it was determined that the command is not a tracking command, then 208 may be skipped and the process may move directly to 210. Once this has been completed, the process may move back to 200 to await another command.

If at 204 it is determined that the command is a save command, then at 212 the object may be added to the save list. Once this has been completed, the process may move back to 200 to await another command.

If at 202 it is determined that the command is a commit command, then the process may move to 214 to begin traversing the dependency list. At 214, it may be determined if any dependencies are left on the dependency list. If so, then at 216 a verify instruction for the next dependency and version on the dependency list may be sent to the database. A 218, a response may be received from the database. At 220, it may be determined if this response indicates that the verification was valid. If not, then at 222 an error may be returned. Otherwise, the process may move back to 214, advancing to the next dependency and determining if any dependencies are left on the dependency list.

If at 214 it is determined that there are no dependencies left on the dependency list, then the process may move to 224 to begin traversing the save list. At 224, it may be determined if there are any objects left on the save list. If so, then at 226, the next object may be removed from the save list. Then at 228, the process may verify the version of this object in the database. At 230, a response may be received from the database. At 232, it may be determined if the response indicates that the verification of the object is valid. If not, then at 222 an error may be returned. Otherwise, at 234 the version of the object may be incremented and at 236, the object may be saved to the database. The process then may move back to 224, advancing to the next object on the save list and determining if any objects are left on the save list.

If at 224 it is determined that there are no more objects left in the save list, then at 238 the changes may be recorded in the database for others to see. This is an optional act that may allow a broadcast-type message that indicates to other caches and/or business processes that changes have been made to the database. At 240, a commit command may be sent to the database. Finally, at 242, a result of the commit command may be sent to the user.

Figure 3:
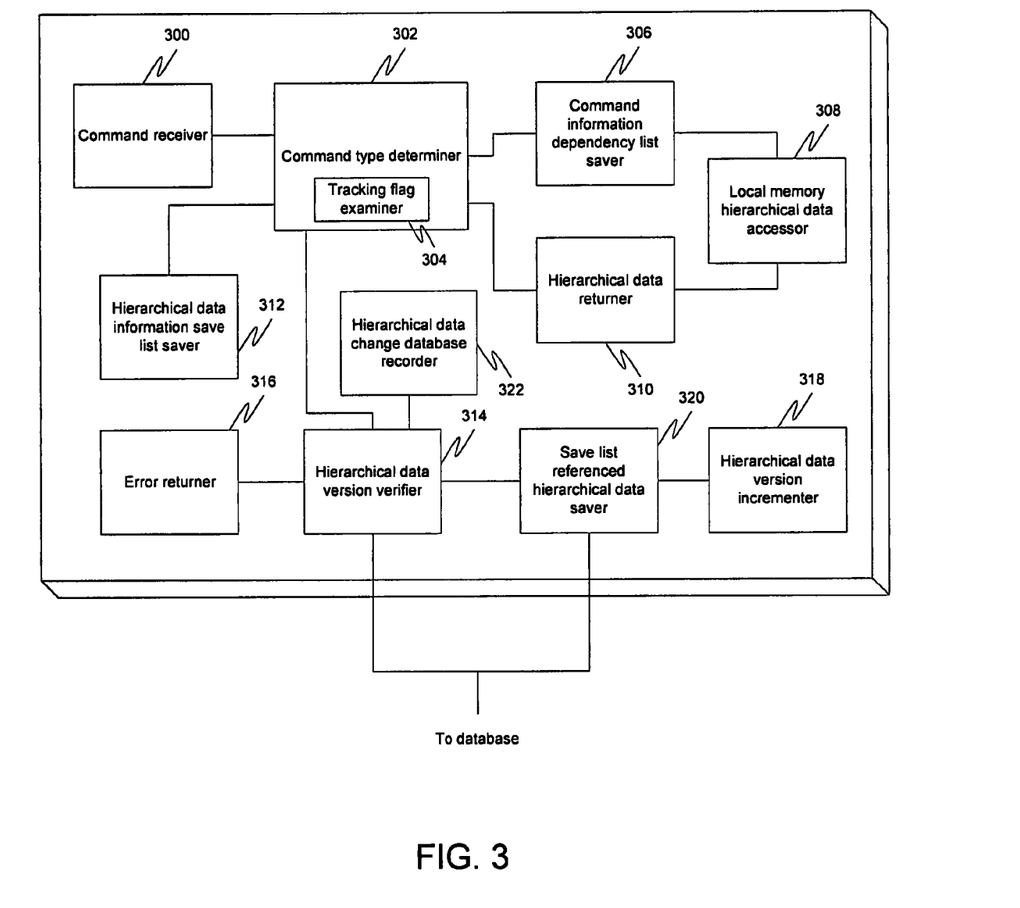
FIG. 3 is a block diagram illustrating an apparatus for editing hierarchical data in accordance with an embodiment of the present invention.

FIG. 3 is a block diagram illustrating an apparatus for editing hierarchical data in accordance with an embodiment of the present invention. The apparatus may be contained in the cache, or by a device or program controlling the cache. Each of the acts performed by the apparatus may be performed by hardware or software.

A command receiver 300 may receive a command. The command may include, for example, a member identification as a parameter. Additionally, if multiple transactions exist, the command may include a transaction identification. A command type determiner 302 coupled to the command receiver 300 may determine if the command is a commit command. If not, then at it may determine if the command is a save command. If not, then it may determine if the command is a tracking command. A tracking command may be defined as a command that is to be tracked. The most obvious example of this for purposes of this document will be a command asking to read a member that has a dependency relationship with another member, however one of ordinary skill in the art will recognize that other commands to be tracked may exist. The tracking command may be designated by a flag accompanying the command indicating that the command is one that should be tracked. Therefore, the command type determiner 302 may include a tracking flag examiner 304.

If the command is a tracking command, then a command information dependency list saver 304 coupled to the command type determiner 302 may save the object ID and version corresponding to the member received with the command on a dependency list. The version may be retrieved from the hierarchy stored in the cache using a local memory hierarchical data accessor 308. Then a hierarchical data returner 310 coupled to the local memory hierarchical data accessor 308 and to the command type determiner 302 may return the information requested by the command. If it was determined that the command is not a tracking command, then the saving of the object ID and version on the dependency list may be skipped and the process may move directly to returning the hierarchical data. Once this has been completed, the process may await another command.

If it is determined that the command is a save command, then a hierarchical data information save list saver 312 coupled to the command type determiner 302 may add the object to the save list. Once this has been completed, the process may await another command.

If it is determined that the command is a commit command, then the process may begin traversing the dependency list. It may be determined if any dependencies are left on the dependency list. If so, then a hierarchical data version verifier 314 coupled to the command type determiner 302 and to a database may send a verify instruction for the next dependency and version on the dependency list to the database. A response may be received from the database. It may be determined if this response indicates that the verification was valid. If not, then an error returner 316 coupled to the hierarchical data version verifier 314 may return an error. Otherwise, the process may advance to the next dependency and determining if any dependencies are left on the dependency list.

If it is determined that there are no dependencies left on the dependency list, then the process may begin traversing the save list. It may be determined if there are any objects left on the save list. If so, then the next object may be removed from the save list. Then the hierarchical data version verifier 314 may verify the version of this object in the database. A response may be received from the database. It may then be determined if the response indicates that the verification of the object is valid. If not, then the error returner 316 may return an error. Otherwise, a hierarchical data version incrementer 318 may increment the version of the object and a save list referenced hierarchy data saver 320 coupled to the hierarchical data version verifier 314 and to the hierarchical data version incrementer 318 may save the object to the database. The process then may advance to the next object on the save list and determine if any objects are left on the save list.

If it is determined that there are no more objects left in the save list, then a hierarchical data change database recorder 322 coupled to the hierarchical data version verifier 314 may record the changes in the database for others to see. This is an optional act that may allow a broadcast-type message that indicates to other caches and/or business processes that changes have been made to the database. A commit command may be sent to the database. Finally, the result of the commit command may be sent to the user.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A program storage device readable by a machine, tangibly embodying a program of instructions executable by the machine to perform a method for accessing hierarchical data stored in a memory, the method comprising:
   receiving a first command related to the hierarchical data, wherein the hierarchical data comprises a first data item having a dependency relationship with a second data item, and the first command references the first data item;
   determining whether the first command is a tracking command based upon information associated with the first command;
   responsive to determining that the first command is a tracking command, saving information regarding the first command in a dependency list, wherein the saved information includes a version number for the first data item;
   receiving a second command after receiving the first command; and
   responsive to determining that the second command is a command to commit changes to the hierarchical data:
      using said information from said dependency list to verify that a version number stored in a database for the first data item matches the version number saved in the dependency list for the first data item, and
      canceling the second command if the version number stored in the database does not match the version number saved in the dependency list.

2. The program storage device of claim 1, wherein said tracking flag is set if the hierarchical data is dependent on previously accessed hierarchical data in the same transaction.

3. The program storage device of claim 1, the method further comprising:
   receiving a command to save changes to the hierarchical data; and
   adding information regarding the hierarchical data to a save list.

4. The program storage device of claim 3, the method further comprising:
   saving hierarchical data referenced by said save list to said database.

5. The program storage device of claim 3, the method further comprising:
   incrementing a version of said hierarchical data referenced by said save list.

6. The program storage device of claim 1, the method further comprising returning an error if the second hierarchical data stored in the database does not match the hierarchical data.

7. The program storage device of claim 1, wherein the information regarding the hierarchical data includes an item identifier that identifies the first data item, and using said information from said dependency list to verify includes verifying that the item identifier included in the information regarding the hierarchical data matches an item identifier stored in the database for the first data item.

8. The program storage device of claim 1, the method further comprising accessing the hierarchical data in a local memory, said local memory periodically updated with new or changed hierarchical data from said database.

9. The program storage device of claim 1, the method further comprising recording changes to the hierarchical data in the database for access by other caches.

10. An apparatus for accessing hierarchical data, the apparatus comprising:
    a processor; and
    a memory coupled to said processor, said memory containing computer instructions, that when executed by the processor cause the processor to:
    receive a first command related to the hierarchical data, wherein the hierarchical data comprises a first data item having a dependency relationship with a second data item, and the first command references the first data item;
    determine whether the first command is a tracking command based upon information associated with the first command;
    responsive to determining that the first command is a tracking command, save information regarding the first command in a dependency list, wherein the saved information includes a version number of the first data item;
    receive a second command after receiving the first command; and
    responsive to determining that the second command is a command to commit changes to the hierarchical data:

use said information from said dependency list to verify that a version number stored in a database for the first data item matches the version number saved in the dependency list for the first data item, and cancel the second command if the version number stored in the database does not match the version number saved in the dependency list.

11. The apparatus of claim 10 wherein the memory further comprises instructions that cause the processor to:

receive a command to save changes to the hierarchical data; and add information regarding the hierarchical data to a save list.

12. The apparatus of claim 10 wherein the memory further comprises instructions that cause the processor to:

increment a version of said hierarchical data referenced by said save list.

13. A method of accessing hierarchical data, the method comprising:

receiving a first command related to the hierarchical data at a cache server, wherein the hierarchical data comprises a first data item having a dependency relationship with a second data item, and the first command references the first data item;

determining whether the first command is a tracking command based upon information associated with the first command;

responsive to determining that the first command is a tracking command, saving information regarding the first command in a dependency list, wherein the saved information includes a first version number for the first data item, and the first version number identifies a version of the first data item stored at the cache server;

receiving a second command after receiving the first command; and responsive to determining that the second command is a command to commit changes to the hierarchical data to a database:

retrieving a second version number from the database, wherein the second version number identifies a version of the first data item stored in the database, and the second version number is based upon the number of times a value of the first data item has been stored in the database;

determining if the second version number matches the first version number, and canceling the second command if the second version number does not match the first version number.

14. The method of claim 13 further comprising:

receiving a command to save changes to the hierarchical data; and adding information regarding the hierarchical data to a save list.

15. The method of claim 13 further comprising:

incrementing a version of said hierarchical data referenced by said save list.

* * * * *

UNITED STATES PATENT AND TRADEMARK OFFICE
CERTIFICATE OF CORRECTION

PATENT NO. : 7,945,542 B2  
APPLICATION NO. : 11/893610  
DATED : May 17, 2011  
INVENTOR(S) : Bakey Page 1 of 1

It is certified that error appears in the above-identified patent and that said Letters Patent is hereby corrected as shown below:

In column 2, line 14, delete "layer," and insert -- later, --, therefor.

In column 3, line 26-27, delete "hard wired" and insert -- hardwired --, therefor.

In column 5, line 48, delete "maybe" and insert -- may be --, therefor.

In column 7, line 62-67, In Claim 1, delete "responsive to determining that the first command is a tracking command, saving information regarding the first command in a dependency list, wherein the saved information includes a version number for the first data item; receiving a second command after receiving the first command; and" and
> insert -- responsive to determining that the first command is a tracking command, saving information regarding the first command in a dependency list, wherein the saved information includes a version number for the first data item;
>> receiving a second command after receiving the first command; and --, therefor.

Signed and Sealed this
Eleventh Day of October, 2011

David J. Kappos
*Director of the United States Patent and Trademark Office*